United States Patent
Chang

(10) Patent No.: US 7,403,459 B2
(45) Date of Patent: *Jul. 22, 2008

(54) ROTATIONAL SPEED CONTROL METHOD FOR A DISK PLAYER

(75) Inventor: Kun-Chang Chang, Taichung (TW)

(73) Assignee: Lite-On It Corp. (TW)

( * ) Notice: Subject to any disclaimer, the term of this patent is extended or adjusted under 35 U.S.C. 154(b) by 718 days.

This patent is subject to a terminal disclaimer.

(21) Appl. No.: 10/890,062

(22) Filed: Jul. 12, 2004

(65) Prior Publication Data

US 2004/0246843 A1    Dec. 9, 2004

Related U.S. Application Data

(63) Continuation-in-part of application No. 10/055,748, filed on Jan. 22, 2002, now Pat. No. 6,795,387.

(51) Int. Cl.
    *G11B 9/00*    (2006.01)
(52) U.S. Cl. .................. 369/53.3; 369/47.38; 360/73.01

(58) Field of Classification Search ............. 369/53.3, 369/59.19, 47.38; 360/73.01
See application file for complete search history.

(56) References Cited

U.S. PATENT DOCUMENTS

| | | | |
|---|---|---|---|
| 4,731,572 A * | 3/1988 | Bolie .................. | 318/721 |
| 4,868,819 A | 9/1989 | Kimura | |
| 5,521,769 A * | 5/1996 | Suga et al. ............ | 360/70 |
| 5,636,196 A | 6/1997 | Kumagai | |
| 6,009,053 A | 12/1999 | Ota et al. | |
| 6,137,757 A | 10/2000 | Kinoshita | |
| 6,523,142 B1 * | 2/2003 | Igari et al. ........... | 714/55 |
| 6,587,411 B2 | 7/2003 | Hayashi | |
| 6,628,595 B1 | 9/2003 | Sasa et al. | |
| 6,795,387 B2 * | 9/2004 | Chang ................ | 369/53.3 |

* cited by examiner

*Primary Examiner*—Gautam R. Patel
(74) *Attorney, Agent, or Firm*—Raymond Sun

(57) ABSTRACT

A method is disclosed for adjusting the rotational speed of a disk player based on a calculated variable. The method increases the rotational speed of the disk player when the calculated variable is greater than a first threshold and decreases the rotational speed of the disk player when the calculated variable is less than a second threshold.

13 Claims, 6 Drawing Sheets

ROTATIONAL SPEED CONTROL METHOD FOR A DISK PLAYER

RELATED CASES

This is a continuation-in-part of Ser. No. 10/055,748, filed Jan. 22, 2002, now U.S. Pat. No. 6,795,387, whose disclosure is incorporated by this reference as though fully set forth herein.

BACKGROUND OF THE INVENTION

1. Field of the Invention

The present invention pertains to a method that dynamically adjusts the rotational speed of a disk drive according to the data transfer rate from the computer system and the disk player.

2. Description of the Prior Art

The increase in the operating speed of personal computers (PCs) has been accompanied by improvements in the transfer speed and capacity of peripheral devices. Under these circumstances, computer storage media have also become multifunctional, instead of simply functioning as a means for the storage of information. For example, the contents of a CD-ROM disk can be music, data, or video. However, different applications may have large differences in the transfer rate between the optical disk player and the PC. For example, when a VCD movie is playing, the transfer rate is only 176 Kbyte/sec, that is, the so-called unit speed. On the other hand, the transfer rate of a document file can exceed 10 Mbyte/sec, an order of magnitudes.

In order to ensure that motor-driven disk drives (also referred to herein as disk players), such as for CD-ROMs, magnetic disks, or hard disks, can provide the transfer rate required by the computer, the motor is usually set to a rotational speed that is much higher than necessary. Thus, in conventional disk drives, it is very common for the motor to rotate at a very high speed even when the transfer rate required by the computer is fairly low. This results not only in inefficient power consumption, but also in noise and vibration generated by the motor when it rotates at high speeds. In addition, reading data at too high a speed may also result in the deterioration of the performance of the disk player.

Therefore, as described above, conventional high-speed disk players typically read data from disks at a set (i.e., fixed) and relatively high rotational speed. Regarding the setting of the motor speed of the disk player, the difficulty is how to calculate the computer system transfer rate. Since the transfer rate between the computer system and the disk player is affected by the time that the disk player itself spends reading data, one cannot simply assume that the amount of data transferred per unit time is the transfer rate.

Thus, there remains a need for disk drive and method that overcomes the drawbacks set forth above.

SUMMARY OF THE DISCLOSURE

It is an object of the present invention to provide a disk drive and method that avoids inefficient power consumption, noise and vibration generated by a disk drive motor that rotates at unnecessarily high speeds.

It is another object of the present invention to provide a disk drive and method that maintains the motor speed at an efficient level.

It is yet another object of the present invention to provide a disk drive and method whose motor speed is dynamically adjusted in accordance with the change in the transfer rate of data required by the computer system.

In order to accomplish the objects of the present invention, the present invention provides a method for adjusting the rotational speed of a disk player based on a calculated variable. Thereafter, the method increases or decreases the rotational speed of the disk player depending on whether the calculated variable is greater or less than one or more thresholds.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

The present invention provides, in a first embodiment, a method for adjusting the rotational speed of a disk player, which includes first calculating the proportion of time which the disk player is reading data from the disk during a unit time T. Thereafter, the method increases the rotational speed of the disk player if the proportion of time that the disk player spends reading data from the disk is greater than a first threshold during each of m consecutive units of time T, and decreases the rotational speed of the disk player if the proportion of time that the disk player spends reading data from the disk is less than a second threshold during each of n consecutive units of time T.

The present invention adopts a few assumptions in its method for adjusting the motor speed of a disk player. Instead of setting the motor speed by directly calculating the amount of data transfer between the computer system and the disk player, a method based on relative speed is used to determine whether to increase or decrease the motor speed. The assumptions are as follows (1) If a disk player only spends a small amount of time during a given time period reading data from a disk, it means that the reading speed of the disk player is higher than is required by the computer system, and therefore the disk player need only spend a small portion of the time reading from the disk to satisfy the required amount of data transfer. In this case, the motor speed should be decreased.

(2) On the other hand, if during most of that given period of time, the disk player is reading data from the disk, then the reading speed of the disk player is less than that required by the computer system. In that case, the motor speed should be increased.

Figure 1:
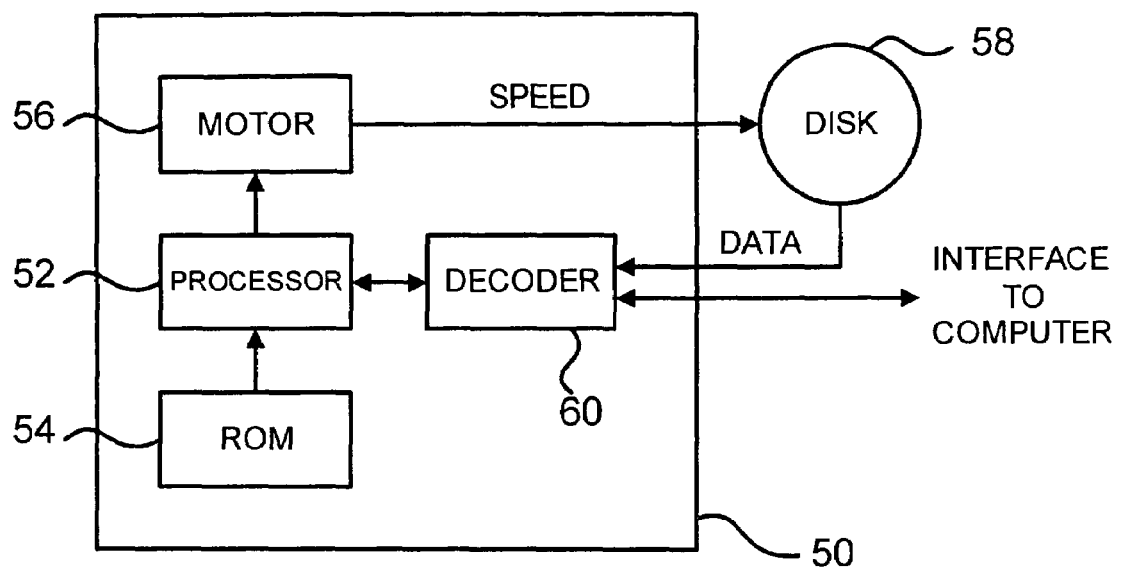
FIG. 1 is a simple block diagram illustrating the primary elements of the system of the present invention.

FIG. 1 illustrates the primary elements of the system of the present invention according to a first embodiment. A disk player or drive 50 has a processor 52 that has an input coupled to a ROM 54 that stores all settings and the speed control software of the present invention. The processor 52 controls a motor 56 that drives the reading of a disk 58, including the reading speed of the disk 58. A decoder 60 is coupled to both the processor 52 and the disk 58 to facilitate the transfer of data from the disk 58 to the processor 52. The decoder 60 can also be coupled to an interface of a PC or other device which is coupled to the disk drive 50. The settings stored in the ROM 54 can include T, H, L, M and N, which are described below.

In operation, after a predetermined period of time T, the proportion of time that the disk player 50 spent reading data from the disk 58 is calculated, and the proportions of the data reading times in the previous m or n units of time periods T are also checked. If, during each such previous m units of time periods T, the proportion of time that the disk player 50 spends reading data from the disk 58 is greater than the threshold H for increasing the rotational speed, then the rotational speed for the motor 56 is increased. On the other hand, if, during each previous n units of time periods T, the proportion of time that the disk player 50 spends reading data from the disk 58 is less than the threshold L for decreasing the rotational speed, then the rotational speed for the motor 56 is decreased. In one non-limiting example, H can be 90%, and L can be 50%.

Figure 2:
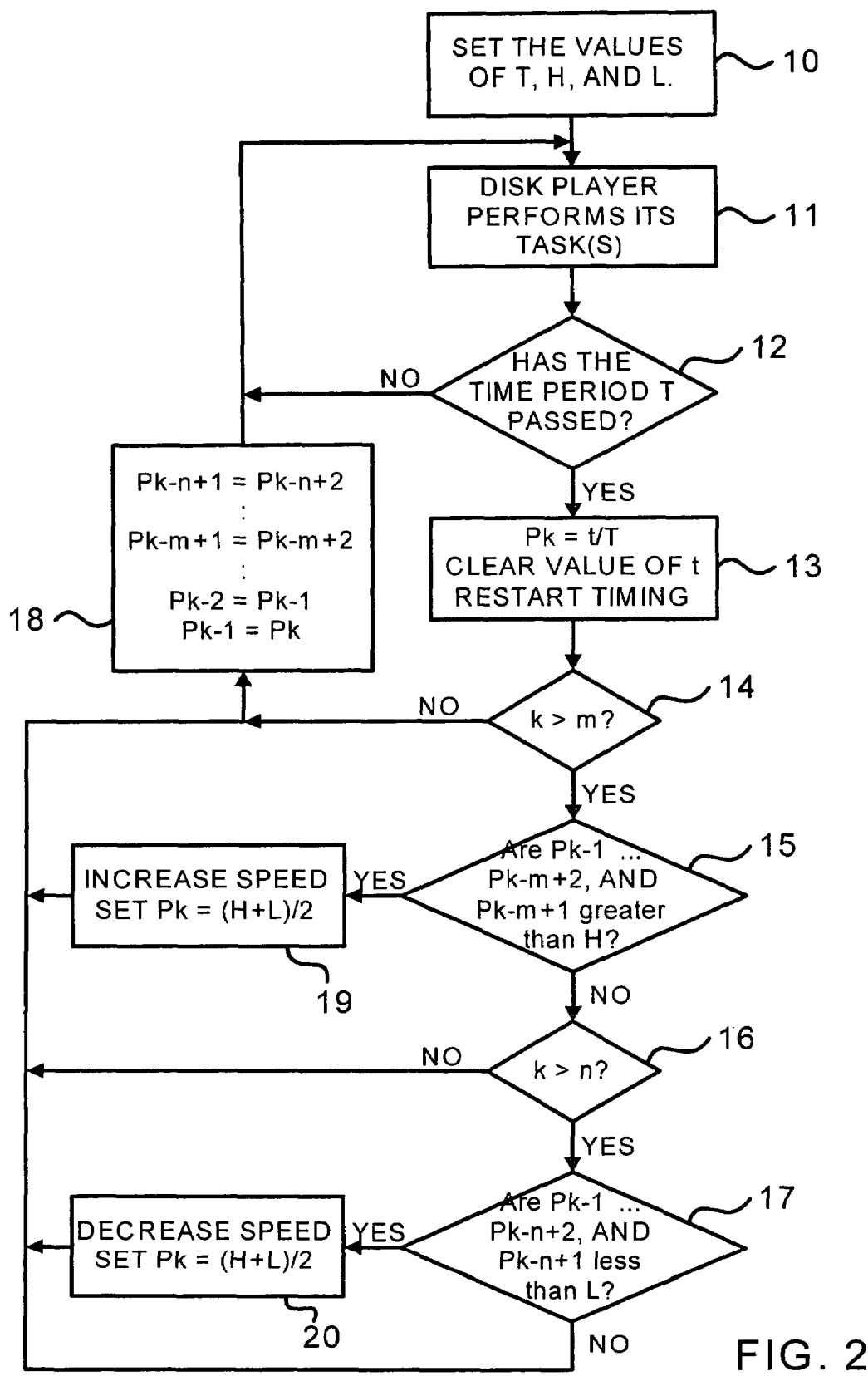
FIG. 2 is a flowchart of a method according to a first embodiment the present invention.

FIG. 2 is a flowchart that illustrates the method according to one embodiment of the present invention. The present invention presents a dynamic speed control method with a variable transfer rate. Under the assumption that n=m, the method includes the following steps:

Step 10: In this step, the values of T, H, and L are preset and the timing is started. Here, T is a constant time period, and H and L are the limit condition values to determine when to increase and decrease, respectively, the rotational speed of the motor. H is usually set at a value that is greater than L, and the values between H and L can be considered to represent the optimum rotational speeds. H and L can be adjusted to obtain the optimum rotational speeds.

Step 11: In this step, the disk player 50 is coupled to the system circuit of FIG. 1 to perform its given task, such as executing commands issued by the computer. Processing then proceeds to step 12.

Step 12: In this step, it is determined whether the time period T has passed. If yes, processing proceeds to step 13. If no, processing returns to step 11.

Step 13: In this step, Pk (i.e., the proportion of the time during which the disk player 50 reads data from the disk 58 during unit time T) is calculated based on t/T (i.e., Pk=t/T), and value of t is cleared, and the timing is restarted. Here, t is the time that the disk player spends reading data from the disk during unit time T, and k is used to denote a single block (see FIG. 3). Processing then proceeds to step 14.

Step 14: In this step, it is determined whether k>m. If yes, this means that m units of time T have passed and processing proceeds to step 15. If no, this means that fewer than m units of time T have passed, and processing proceeds to step 18.

Step 15: In this step, it is determined whether, in each of m previous consecutive units of time periods T (from the current Pk), the proportion of time that the disk player spends reading data from the disk is greater than H. In other words, are each of Pk, Pk-1 . . . Pk-m+2, and Pk-m+1 greater than H? If the proportion of time that the disk player 50 spends reading data from the disk 58 is greater than H for each of m consecutive units of time T, then processing proceeds to step 19 to increase the rotational speed. If the proportion of time that the disk player 50 spends reading data from the disk 58 is not greater than H for each of m previous consecutive units of time T, then processing proceeds to step 16.

Step 16: In this step, it is determined whether k>n. If yes, this means that n units of time T have passed and processing proceeds to step 17. If no, this means that fewer than n units of time T have passed, and processing proceeds to step 18.

Step 17: In this step, it is determined whether, in each of n previous consecutive units of time periods T (from the current Pk), the proportion of time that the disk player 50 spends reading data from the disk 58 is less than L. In other words, are each of Pk, Pk-1 . . . Pk-n+2, and Pk-n+1 less than L? If the proportion of time that the disk player 50 spends reading data from the disk 58 is less than L for each of n consecutive units of time T, then processing proceeds to step 20 to decrease the rotational speed. If the proportion of time that the disk player 50 spends reading data from the disk 58 is not less than L for each of n previous consecutive units of time T, then processing proceeds to step 18.

Step 18: The values of Pk-1 . . . Pk-n+1 are updated by shifting the values of Pk-1 . . . Pk-n+1. For example, Pk-n+1=the current Pk-n+2; . . . Pk-m+1=the current Pk-m+2; . . . Pk-2=the current Pk-1; Pk-1=the current Pk are set, and processing returns to step 11. This shifting allows for the new Pk to be calculated.

Step 19: In this step, the rotational speed is increased by the processor 52. The speed can be increased by using a number of different techniques, depending on the desired parameters and applications. For example, each incremental speed increase can be the same. As another example, a table (stored in the ROM 54) can be used to store a number of pre-set increases, such as (but not limited to) 1000, 2000, 4000, 6000 rpm, etc. Thus, the first increase might be by 1000 rpm, the second increase would be by 2000 rpm, then the next increase would be by 4000 rpm, and so on. If such a technique is implemented, then any subsequent decreases (see step 20) would have to follow the same progression, so that if the most recent speed increase was by 400 rpm, then a subsequent speed decrease would also be by 400 rpm, then the next speed decrease would be by 200 rpm, and so on. Then, Pk=(H+L)/2 is set so as to set Pk to a value between H and L to prevent another immediate increase or decrease when the next Pk is calculated in step 13. Processing then proceeds to step 18.

Step 20: In this step, the rotational speed is decreased using principles similar to those explained above in connection with step 19. Then Pk=(H+L)/2 is set (for the same reason as for step 19 above), and processing then proceeds to step 18.

As an alternative, steps 16 and 17 can be performed before steps 14 and 15 because these two procedures are independent of each other.

In addition, m and n can be adjusted. For example, if m and n are increased to obtain a more stable speed change, this will carry with it an increase in the response time (i.e., more time is needed to achieve the required speed). To illustrate, assume that T=0.64 seconds. If m=4, then 0.64*4=2.56 seconds are required to increase the rotational speed. On the other hand, if m=6, then 0.64*6=3.84 seconds are required to increase the rotational speed.

Figure 3:
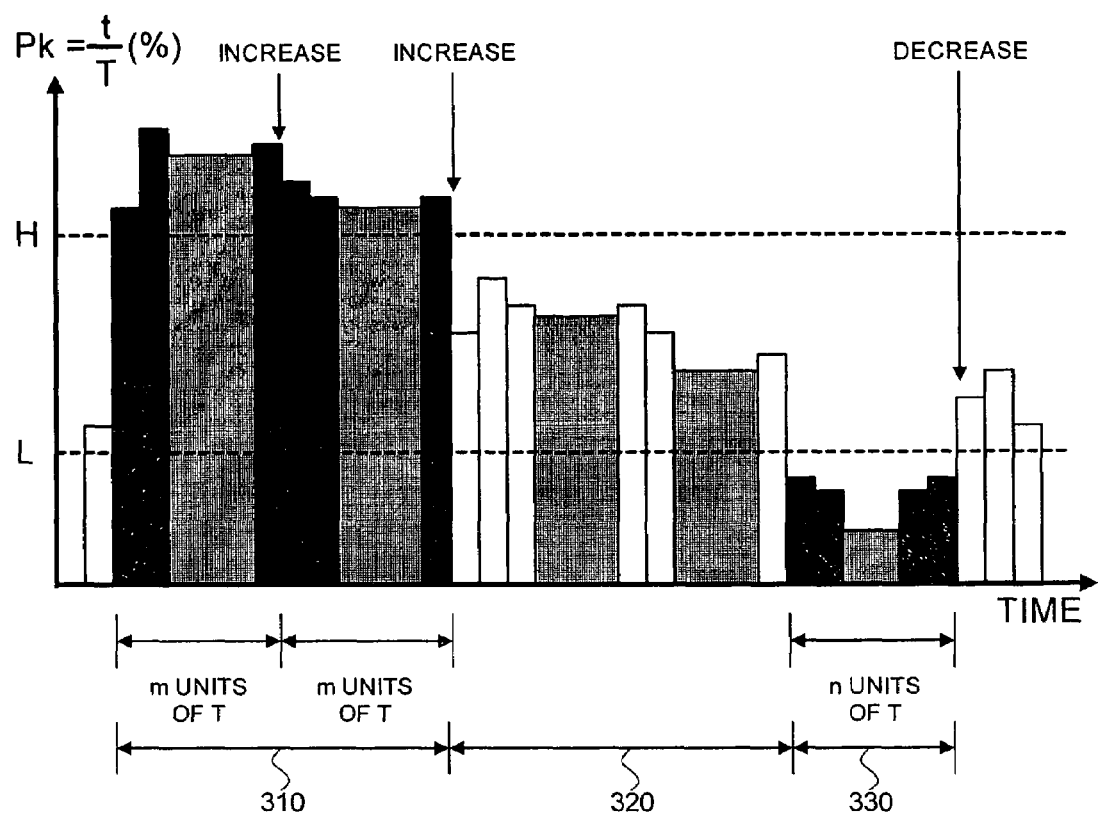
FIG. 3 is a chart that illustrates the relationship between Pk (i.e., the proportion of the time during which the disk player reads data from the disk during unit time T) and the time during normal operation of the method of FIG. 2.

According to the aforementioned method and as illustrated in FIG. 3, if the disk player 50 constantly reads data from the disk 58 for most of a given time period, this indicates that the disk player 50 is being overburdened, and the reading speed is less than the speed required by the computer system. Therefore, the rotational speed of the motor 56 should be increased to obtain a higher data transfer rate to meet the requirement of the computer system. On the other hand, if the disk player 50 reads data from the disk 58 for only a small part of a given time period, it indicates that the data transfer rate at the present rotational speed is much greater than that needed by the computer system. Thus, the rotational speed of the motor 56 should be decreased, and the motor 56 should be controlled to work at a more efficient rotational speed that is sufficient for the transfer rate required by the computer system. For example, FIG. 3 illustrates that the rotational speed is increased when Pk exceeds H for m periods time T during the period 310. During the period 320, Pk is between the H and L values, so no changes in the rotational speed are needed. Then, the rotational speed is decreased when Pk is less than L for n periods time T during the period 330.

Figure 4:
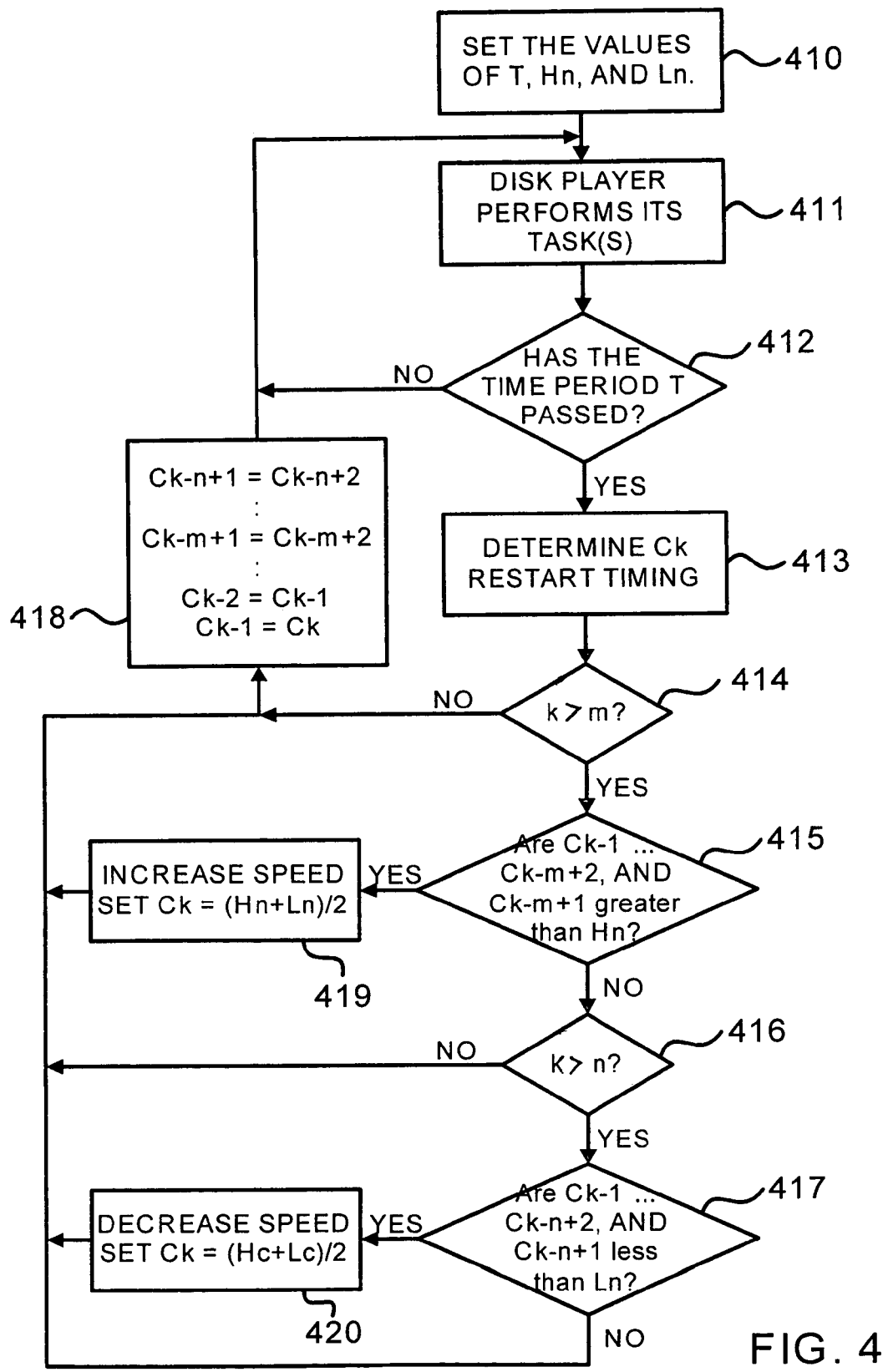
FIGS. 4-6 are flowcharts of methods according to second, third and fourth embodiments of the present invention.

FIG. 4 is a flowchart that illustrates a method according to a second embodiment of the present invention, which illustrates another way to measure the loading of the player. The relationship between the reading speed of the disk player and the data speed requested by the computer system is decided by counting the number of read-commands received by the disk player 50. A read-command is the command that is issued by the computer and received by the disk player 50 for the computer to request a certain section of data on the storage medium from the disk player 50. The method includes the following steps:

Step 410: In this step, the values of T, Hn, and Ln are preset and the timing is started. Here, T is a constant time period, and Hn and Ln are the limit condition values to determine when to increase and decrease, respectively, the rotational speed of the motor. Hn is usually set at a value that is greater than Ln. In this current example, the unit for Hn and Ln could be the number of read-commands.

Step 411: In this step, the disk player 50 is coupled to the system circuit of FIG. 1 to perform its given task, such as executing commands issued by the computer. Processing then proceeds to step 412.

Step 412: In this step, it is determined whether the time period T has passed. If yes, processing proceeds to step 413. If no, processing returns to step 411.

Step 413: In this step, an index Ck is determined by counting the number of read-commands received by the disk player 50 during a predetermined period of time T, and the timing is restarted. Here k is an index that is similar to that used in step 13 of FIG. 2. In this example, Ck could be the number of read-commands issued by the computer during each unit time T. Furthermore, for read-commands requesting data stored in consecutive addresses, the burden to the disk player 50 may not as heavy as read-commands requesting data stored in non-consecutive addresses. Thus, different read-commands could be given various weighting according to their types and the loading they require, and Ck could also be a weighted summation of read-commands during each unit time T. Processing then proceeds to step 414.

Step 414: In this step, it is determined whether k>m. If yes, this means that m units of time T have passed and processing proceeds to step 415. If no, this means that fewer than m units of time T have passed, and processing proceeds to step 418.

Step 415: In this step, it is determined whether, in each of m previous consecutive units of time periods T (from the current Ck), each of the counted value of read-commands is greater than Hn. In other words, are each of Ck, Ck-1 ... Ck-m+2, and Ck-m+1 greater than Hn? If the counted value of read-commands that the disk player 50 received is greater than Hn for each of m consecutive units of time T, then processing proceeds to step 419 to increase the rotational speed. If the counted value of read-commands that the disk player 50 received is less than Hn for each of m previous consecutive units of time T, then processing proceeds to step 416.

Step 416: In this step, it is determined whether k>n. If yes, this means that n units of time T have passed and processing proceeds to step 417. If no, this means that fewer than n units of time T have passed, and processing proceeds to step 418.

Step 417: In this step, it is determined whether, in each of n previous consecutive units of time periods T (from the current Ck), the counted value of read-commands that the disk player received is less than Ln. In other words, are each of Ck, Ck-1 ... Ck-n+2, and Ck-n+1 less than Ln? If the counted value of read-commands that the disk player 50 received is less than Ln for each of n consecutive units of time T, then processing proceeds to step 420 to decrease the rotational speed. If the counted value of read-commands that the disk player 50 received is greater than Ln for each of n previous consecutive units of time T, then processing proceeds to step 418.

Step 418: The values of Ck-1 ... Ck-n+1 are updated by shifting the values of Ck-1 ... Ck-n+1. For example, Ck-n+1=the current Ck-n+2; ... Ck-m+1=the current Ck-m+2; ... Ck-2=the current Ck-1; Ck-1=the current Ck are set, and processing returns to step 411. This shifting allows for the new Ck to be calculated.

Step 419: In this step, the rotational speed is increased by the processor 52. The speed can be increased by using a number of different techniques similar to those disclosed in step 19 above, and can be dependent on the desired parameters and applications. Moreover, Ck=(Hn+Ln)/2 is set so as to set Ck to a value between Hn and Ln to prevent another immediate increase or decrease when the next Ck is determined in step 413. Processing then proceeds to step 418.

Step 420: In this step, the rotational speed is decreased using principles similar to those explained above in connection with step 19. Then Ck=(Hn+Ln)/2 is set (for the same reason as for step 419 above), and processing then proceeds to step 418.

As an alternative, steps 416 and 417 can be performed before steps 414 and 415 because these two procedures are independent of each other.

In addition, m and n can be adjusted. For example, if m and n are increased to obtain a more stable speed change, this will carry with it an increase in the response time (i.e., more time is needed to achieve the required speed) as illustrated in previous embodiment.

Figure 5:
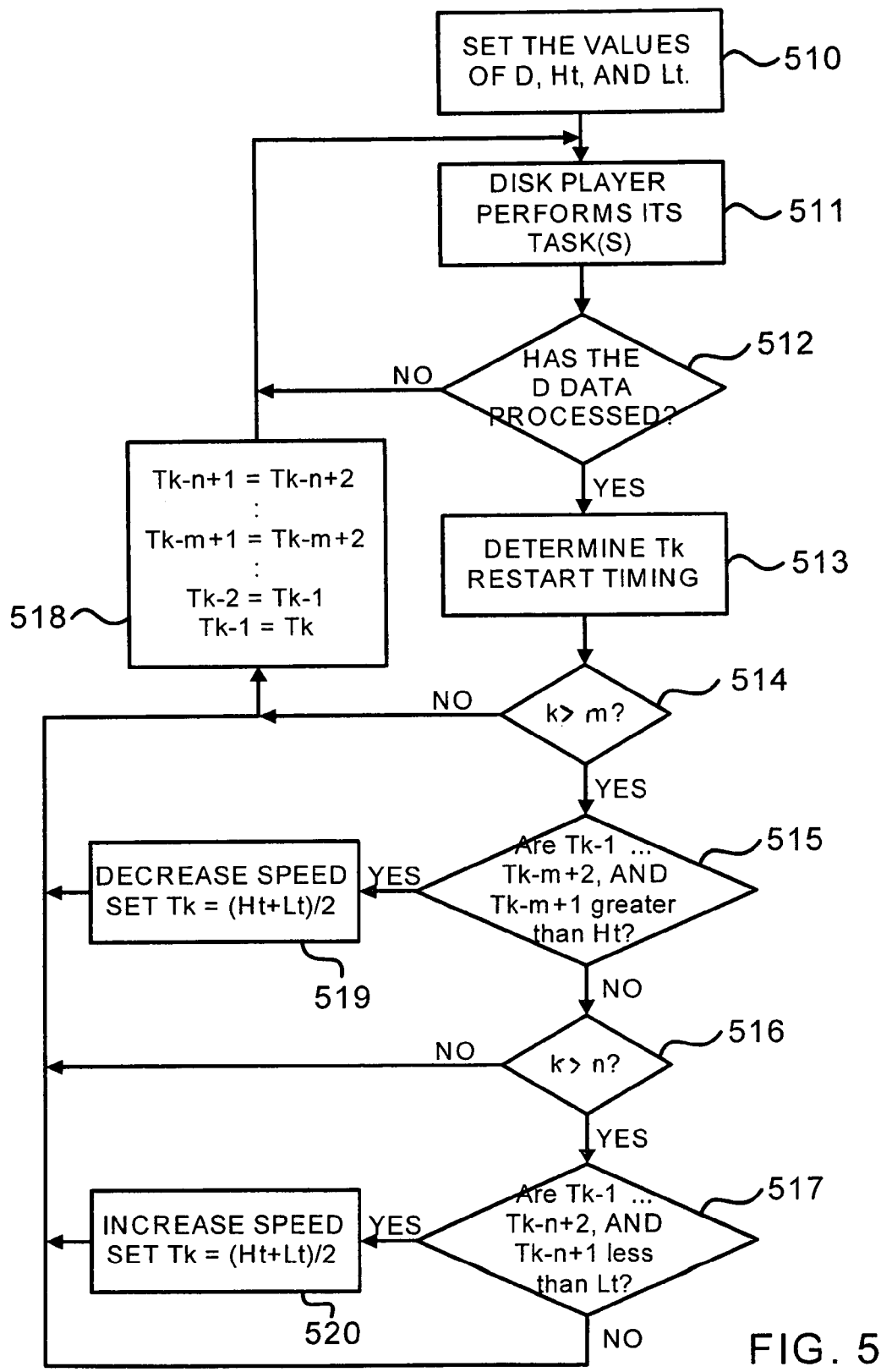

FIG. 5 is a flowchart which illustrates a method according to a third embodiment of the present invention. The loading of the disk player 50 can be measured in a different way. Instead of monitoring the works during each time unit T, the method of FIG. 5 monitors the processing time needed by the disk player 50 to finish a fixed amount of works. For example, by measuring the time spent to finish reading a certain number of bytes of data, the proper speed requested by the computer can thus be derived. The method includes the following steps:

Step 510: In this step, the values of D, Ht, and Lt are preset and the timing is started. Here, D is a certain amount of data such as 10 M bytes, and Ht and Lt are the limit condition values to determine when to decrease and increase, respectively, the rotational speed of the motor. Ht is usually set at a value that is greater than Lt, and Ht and Lt can be adjusted to obtain the optimum rotational speeds.

Step 511: In this step, the disk player 50 is coupled to the system circuit of FIG. 1 to perform its given task, such as executing commands issued by the computer. Processing then proceeds to step 512.

Step 512: In this step, it is determined whether the predetermined amount of data D has been processed or requested by the computer. If yes, processing proceeds to step 413. If no, processing returns to step 411.

Step 513: In this step, an index Tk is determined by calculating the time passed for the disk player 50 to finish a fixed amount of works, and then the timing is restarted. Here k is an index similar to that described in step 13 of FIG. 2, and Tk here represents the total time that the disk player 50 consumes to process the D amount of data. For example, D amount of data could be set as 10M bytes of data, and Tk is set as the time period that the disk player 50 needs to transmit 10 M bytes to the computer. Processing then proceeds to step 514.

Step 514: In this step, it is determined whether k>m. If yes, this means that m units of data D have been processed and processing proceeds to step 515. If no, this means that fewer than m units of data D have been processed and processing proceeds to step 518.

Step 515: In this step, it is determined whether, in the processing of each of m previous consecutive units of D amount of data (from the current Tk), the time consumed by the player is greater than Ht. In other words, are each of Tk, Tk-1 . . . Tk-m+2, and Tk-m+1 greater than Ht? If the time that the disk player 50 spends processing D amount of data is greater than Ht for each of m consecutive units of D amount of data, then processing proceeds to step 519 to decrease the rotational speed. If the time that the disk player 50 spends processing D amount of data is less than Ht for each of m consecutive units of D amount of data, then processing proceeds to step 516.

Step 516: In this step, it is determined whether k>n. If yes, this means that n units of data D have been processed and processing proceeds to step 517. If no, this means that fewer than n units of data D have been processed and processing proceeds to step 518.

Step 517: In this step, it is determined whether, in the processing of each of n previous consecutive units of D amount of data (from the current Tk), the time consumed by the player is greater than Ht. In other words, are each of Tk, Tk-1 . . . Tk-n+2, and Tk-n+1 less than Lt? If the time that the disk player 50 spends processing D amount of data is less than Lt for each of n consecutive units of D amount of data, then processing proceeds to step 520 to increase the rotational speed. If the time that the disk player 50 spends processing D amount of data is greater than Lt for each of n consecutive units of D amount of data, then processing proceeds to step 518.

Step 518: The values of Tk-1 . . . Tk-n+1 are updated by shifting the values of Tk-1 . . . Tk-n+1. For example, Tk-n+1=the current Tk-n+2; . . . Tk-m+1=the current Tk-m+2; . . . Tk-2=the current Tk-1; Tk-1=the current Tk are set, and processing returns to step 511. This shifting allows for the new Tk to be calculated.

Step 519: In this step, the rotational speed is decreased by the processor 52 using the same principles disclosed above. After decreasing the rotational speed, Tk=(Ht+Lt)/2 is set so as to set Tk to a value between Ht and Lt to prevent another immediate increase or decrease when the next Tk is calculated in step 513. Processing then proceeds to step 518.

Step 520: In this step, the rotational speed is increased using principles similar to those explained above in step 19 and 419. Then Tk=(Ht+Lt)/2 is set (for the same reason as for step 519 above), and processing then proceeds to step 518.

As an alternative, steps 516 and 517 can be performed before steps 514 and 515 because these two procedures are independent of each other. In addition, m and n can be adjusted as illustrated in previous embodiment.

Figure 6:
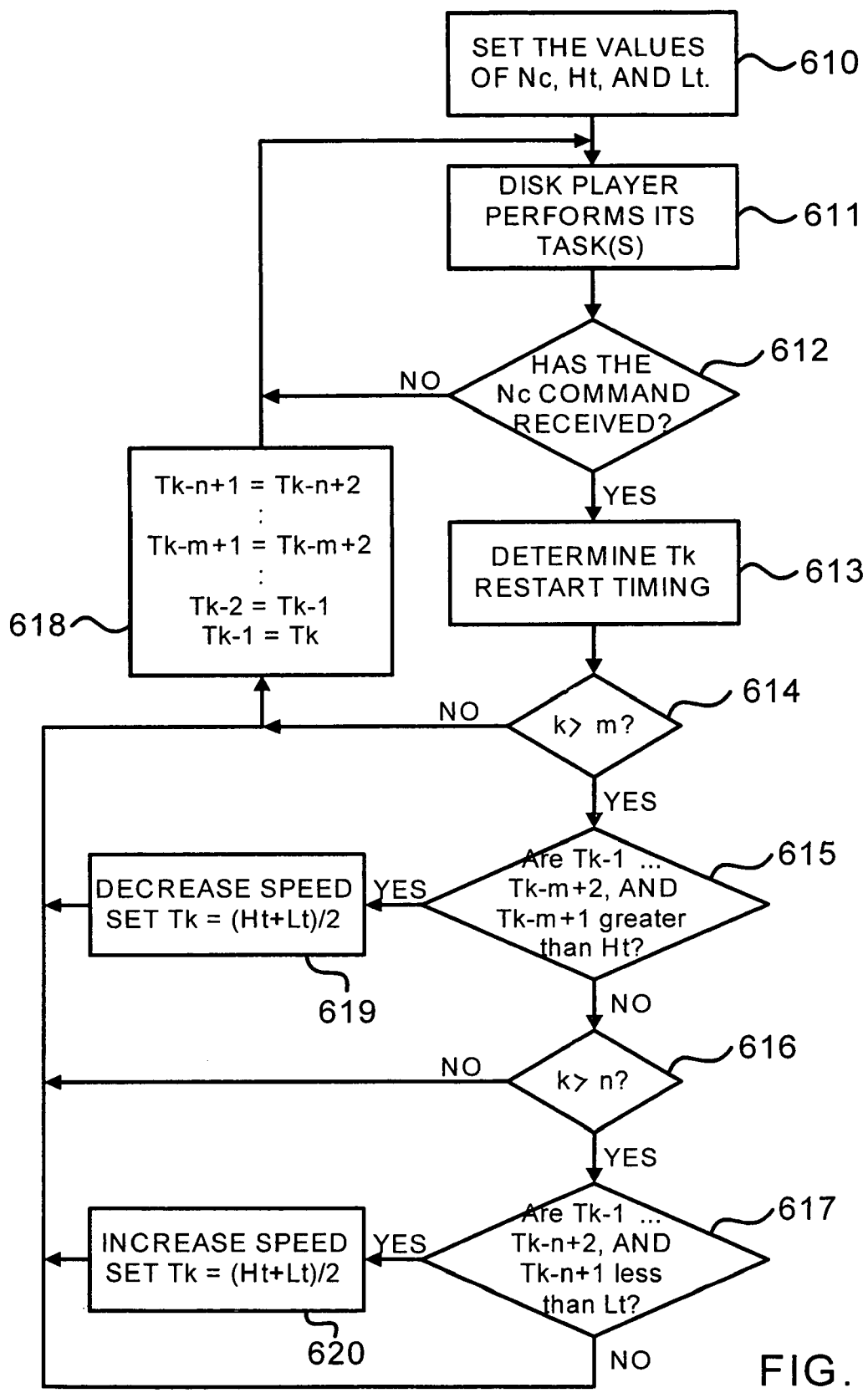

FIG. 6 is a flowchart which illustrates a method according to a fourth embodiment of the present invention. Similar to the third embodiment, the embodiment in FIG. 6 monitors the processing time needed by the disk player 50 to finish a fixed amount of works. Instead of measuring the time spent to finish reading a certain number of bytes of data, a count value based on the number of read-commands received by the disk player 50 is determined. The method includes the following steps:

Step 610: In this step, the values of Nc, Ht, and Lt are preset and the timing is started. Here, Nc is a predetermined value for the number of read-commands, and Ht and Lt are the limit condition values to determine when to decrease and increase, respectively, the rotational speed of the motor. Ht is usually set at a value that is greater than Lt, and Ht and Lt can be adjusted to obtain the optimum rotational speeds.

Step 611: In this step, the disk player 50 is coupled to the system circuit of FIG. 1 to perform its given task, such as executing commands issued by the computer. Processing then proceeds to step 612.

Step 612: In this step, it is determined whether the predetermined number of read-commands Nc have been processed or requested by the computer. If yes, processing proceeds to step 613. If no, processing returns to step 611. As mentioned above in connection with the second embodiment, read-commands requesting data stored in consecutive addresses imposes a lesser burden to the disk player 50 than read-commands requesting data stored in non-consecutive addresses. Thus the number of read-commands Nc could be a count number such as a weighted summation of read-commands issued by the computer.

Step 613: In this step, an index Tk is determined by calculating the time taken for the disk player 50 to finish a fixed amount of works, and then the timing is restarted. Here, k is an index that can be similar to that described in step 13 of FIG. 2, and Tk represents the total time that the disk player 50 consumes to process the Nc read-commands. Processing then proceeds to step 614.

Step 614: In this step, it is determined whether k>m. If yes, this means that m units of Nc read-commands have been processed and processing proceeds to step 615. If no, this means that fewer than m units of Nc read-commands have been processed and processing proceeds to step 618.

Step 615: In this step, it is determined whether, in the processing of each of m previous consecutive units of Nc read-commands (from the current Tk), the time consumed by the player is greater than Ht. In other words, are each of Tk, Tk-1 . . . Tk-m+2, and Tk-m+1 greater than Ht? If the time that the disk player 50 spends processing Nc read-commands is greater than Ht for each of m consecutive units of Nc read-commands, then processing proceeds to step 619 to decrease the rotational speed. If the time that the disk player 50 spends processing Nc read-commands is less than Ht for each of m consecutive units of Nc read-commands, then processing proceeds to step 616.

Step 616: In this step, it is determined whether k>n. If yes, this means that n units of Nc read-commands have been processed and processing proceeds to step 617. If no, this means that fewer than n units of Nc read-commands have been processed and processing proceeds to step 618.

Step 617: In this step, it is determined whether, in the processing of each of n previous consecutive units of Nc read-commands (from the current Tk), the time consumed by the player is greater than Ht. In other words, are each of Tk, Tk-1 . . . Tk-n+2, and Tk-n+1 less than Lt? If the time that the disk player 50 spends processing Nc read-commands is less than Lt for each of n consecutive units of Nc read-commands, then processing proceeds to step 620 to increase the rotational speed. If the time that the disk player 50 spends processing Nc read-commands is greater than Lt for each of n consecutive units of Nc read-commands, then processing proceeds to step 618.

Step 618: The values of Tk-1 ... Tk-n+1 are updated by shifting the values of Tk-1 ... Tk-n+1. For example, Tk-n+1=the current Tk-n+2; ... Tk-m+1=the current Tk-m+2; ... Tk-2=the current Tk-1; Tk-1=the current Tk are set, and processing returns to step 611. This shifting allows for the new Tk to be calculated.

Step 619: In this step, the rotational speed is decreased by the processor 52 using the principles described above. After decreasing the rotational speed, Tk=(Ht+Lt)/2 is set so as to set Tk to a value between Ht and Lt to prevent another immediate increase or decrease when the next Tk is calculated in step 613. Processing then proceeds to step 618.

Step 620: In this step, the rotational speed is increased using principles similar to those explained above in step 19 and 419. Then Tk=(Ht+Lt)/2 is set (for the same reason as for step 619 above), and processing then proceeds to step 618. As an alternative, steps 616 and 617 can be performed before steps 614 and 615 because these two procedures are independent of each other. In addition, m and n can be adjusted as illustrated in previous embodiment.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A method for controlling the rotational speed of a disk player, comprising:
   (a) calculating a weighted summation (Ck) of read-commands which the disk player receives during a unit time T;
   (b) increasing the rotational speed of the disk player if the weighted summation is greater than a first threshold during each of m consecutive units of time T; and
   (c) decreasing the rotational speed of the disk player if the weighted summation is less than a second threshold during each of n consecutive units of time T.

2. The method of claim 1, wherein the first threshold is greater than the second threshold.

3. The method of claim 1, wherein the weighted summation is the number of read-commands during a unit time T.

4. The method of claim 1, further including shifting the values of a predetermined number of previous consecutive Ck values.

5. The method of claim 1, further including setting Ck to a value that is between the values of the first threshold and the second threshold after performing either step (b) or step (c).

6. A method for controlling the rotational speed of a disk player, comprising:
   (a) determining a period of time (Tk) the disk player spends processing a predetermined amount (D) of data;
   (b) decreasing the rotational speed of the disk player if the time Tk is greater than a first threshold during each of m consecutive units of data D; and
   (c) increasing the rotational speed of the disk player if the time Tk is less than a second threshold during each of n consecutive units of data D.

7. The method of claim 6, wherein the first threshold is greater than the second threshold.

8. The method of claim 6, further including shifting the values of a predetermined number of previous consecutive Tk values.

9. The method of claim 6, further including setting Tk to a value that is between the values of the first threshold and the second threshold after performing either step (b) or step (c).

10. A method for controlling the rotational speed of a disk player, comprising:
    (a) determining a period of time (Tk) the disk player spends processing a predetermined number of read-commands;
    (b) decreasing the rotational speed of the disk player if the time Tk is greater than a first threshold during each of m consecutive units of read-commands Nc; and
    (c) increasing the rotational speed of the disk player if the time Tk is less than a second threshold during each of n consecutive units of read-commands Nc.

11. The method of claim 10, wherein the first threshold is greater than the second threshold.

12. The method of claim 10, further including shifting the values of a predetermined number of previous consecutive Tk values.

13. The method of claim 10, further including setting Tk to a value that is between the values of the first threshold and the second threshold after performing either step (b) or step (c).

* * * * *